United States Patent [19]

Kauffman

[11] Patent Number: 4,759,273
[45] Date of Patent: Jul. 26, 1988

[54] SPLASH RETAINING ASSEMBLY FOR USE WITH A COFFEEMAKER

[76] Inventor: William Kauffman, 63 Robbinsville-Allentown Rd., Robbinsville, N.J. 08691

[21] Appl. No.: 79,616

[22] Filed: Jul. 30, 1987

[51] Int. Cl.4 .............................................. A47J 31/44
[52] U.S. Cl. ....................................... 99/279; 99/295; 426/433
[58] Field of Search .................. 99/279, 295, 306, 304, 99/300; 426/433; 210/481, 474

[56] References Cited

U.S. PATENT DOCUMENTS

| | | | |
|---|---|---|---|
| 3,444,804 | 5/1969 | Stozek | 99/295 X |
| 3,590,724 | 7/1971 | Lorang | 99/295 X |
| 3,693,535 | 9/1972 | Abel, Jr. | 99/282 |
| 3,793,935 | 2/1974 | Martin | 99/295 X |
| 3,861,285 | 1/1975 | Martin | 99/295 |
| 4,192,227 | 3/1980 | Petry | 99/279 |
| 4,278,013 | 7/1981 | Noren et al. | 99/304 X |
| 4,280,401 | 7/1981 | Cleland | 99/295 |
| 4,476,775 | 10/1984 | Daugherty | 99/304 X |

Primary Examiner—Harvey C. Hornsby
Assistant Examiner—Stephen Gerrity
Attorney, Agent, or Firm—Sperry, Zoda & Kane

[57] ABSTRACT

A splash retaining assembly usable with a coffeemaker which has a spray head and a brew basket mountable directly therebelow within basket support guides. The spray retaining assembly includes a main plate extending horizontally and having a horizontal section with a main central aperture defined therein. Vertical sections at the laterally outermost edges of horizontal section extend downwardly and a lower lip extends inwardly from the lowermost end of the vertical sections in order to define with the vertical section and the horizontal section a longitudinal slot. In this manner the main plate is adapted to be positioned in the basket support guides to provide the splash plate and also to define longitudinal slots adapted to receive placement of the brew basket therein for normal operation thereof. A shield plate is secured to the main plate and has an outer section which is secured to the horizontal section of the main plate and an upper section which is generally arcuate having a downwardly facing concave surface and is adapted to be in close proximity with the spray head of the coffeemaker for shielding the coffeemaker from hot coffee vapors rising from the brew basket. The splash retaining assembly is maintained in place by a main biasing device for holding the main plate within the basket support guides and by a basket biasing means for retaining a brew basket within the longitudinal slots defined by the main plate.

19 Claims, 3 Drawing Sheets

SPLASH RETAINING ASSEMBLY FOR USE WITH A COFFEEMAKER

BACKGROUND OF THE INVENTION

1. Field of the Invention

The present invention pertains to devices usable as add on attachments to conventional coffeemakers. These coffeemakers of the type normally available to consumers or to commercial users. Such coffeemakers include a spray head through which hot water is gravity fed into a brew basket therebelow. The brew basket is adapted to hold coffee therein and upon contact with the hot water being guided therein by the spray head will form coffee. The brew basket is mounted to the coffeemaker in a position directly below the spray head by a pair of rails defined as the basket support guides which extend longitudinally along both sides of the spray head and therebelow.

2. Description of the Prior Art

There are a number of prior art devices which provide attachments usable with respect to conventionally configured coffeemakers. Examples of such devices are U.S. Pat. No. 3,590,724 issued July 6, 1971 to Walter R. Lorang on a Hot Drink Machine; U.S. Pat. No. 3,693,535 issued Sept. 26, 1972 to Edmund A. Abel, Jr. on a Pour-In, Instant Brewing Electric Coffeemaker; U.S. Pat. No. 3,793,935 issued Feb. 26, 1974 to John C. Martin on a Coffee Making Machine Convertible Between Funnel-Filter Operation And Pouch Pack Operation; U.S. Pat. No. 3,861,285 issued Jan. 21, 1975 to John C. Martin on a Coffee Making Machine Convertible Between Funnel-Filter Operation and Pouch Pack Operation; U.S. Pat. No. 4,192,227 issued Mar. 11, 1980 to Stanton H. Petry on a Beverage Brewer; and U.S. Pat. No. 4,280,401 issued July 28, 1981 to Robert K. Cleland on a Brew Rail Adapter.

SUMMARY OF THE INVENTION

The present invention provides a splash retaining assembly for use with a coffeemaker having a spray head and a brew basket securable with respect thereto. The brew basket is preferably securable in a position below the spray head in basket support guides. A main plate means is included in the present invention extending generally horizontally and is adapted to be removably positionable mounted within these basket support guides.

The main plate means preferably includes a generally horizontally extending section located between the basket support guides which defines a main central aperture or opening centrally therein in a position vertically below the spray head of the coffeemaker. Vertical sections are also included extending downwardly from the laterally outwardmost edges of the horizontal section. Furthermore, a lower lip extends laterally inwardly from the lowermost edges of these vertical sections such that the lower lip in cooperation with the horizontal section and the vertical section will define therebetween a longitudinally extending slot means along each outermost lateral edge of the horizontal section such as to provide a means for receiving of a conventional brew basket slidably movably detachable therein.

A main biasing means may be included located adjacent the slot means and extending outwardly therefrom to thereby bias the splash retaining assembly firmly in position within the basket support guides. Additionally, a basket biasing means may be positioned within the slot means and adapted to exert bias against the brew basket positioned therein to firmly retain the brew basket in place while still allowing selective removal when desired.

A shield plate is preferably included which is secured with respect to the main plate and is adapted to be positioned adjacent to the spray head thereabove. This shield plate should include an outer section extending generally horizontally adjacent to the horizontal section of tne main plate and preferably located therebelow. An upper section is also included centrally located within the outer section to extend upwardly and inwardly therefrom. This upper section will preferably define a central shield aperture therein adapted to be positioned above the main central aperture of the main plate and immediately adjacent the spray head for shielding both the spray head and the surrounding coffeemaker construction from hot coffee vapors rising from the coffee brewing in the brew basket.

The outer section of the shield plate preferably extends horizontally adjacent to the lower surface of the horizontal section of the main plate. The preferred configuration is where the shield plate is secured with respect to this horizontal section of the main plate. This attachment may be such as being spot welded or otherwise fixedly secured.

Preferably the basket biasing means is a flat spring of resilient material which extends upwardly from the upper surface of the lower lip. This flat spring preferably is of a flexibly resilient material such as stainless steel. It is also preferable that the basket biasing member or flat spring is positioned in the approximate longitudinal center of the laterally extending slots such as to contact the brew basket positioned centrally below the spray head of the coffeemaker.

It is also preferred that the shield plate extends below the horizontal section of the main plate in such a manner as to extend into the slot immediately above where the lower lip means may define longitudinally extending openings therein. The shield plate then will preferably include a main biasing means such as a flat spring extending downwardly therefrom through the longitudinal opening to bias against the basket support guides for firmly retaining the slash retaining assembly therein. Preferably it will be four such configurations in the front and back of each lower lip means to maintain a fixed orientation of the assembly with respect to the coffeemaker. Preferably the flat springs of this main biasing means will be of a flexibly resilient material such as stainless steel.

To facilitate movement of the assembly in position between the basket support guides and to facilitate removal therefrom, it is preferable to include a handle means which may be secured with respect to the horizontal section of the main plate to facilitate this movement. It is also preferable that the main plate and the shield plate will both be of a stainless steel material wherein the shield plate is of a more flexibly resilient and thinner stainless material to facilitate flexing of this portion of the assembly. It is further preferable that the upper section of the shield plate is arcuate in such a manner as to define a downwardly facing concave surface about the central shield aperture therein to thereby further control the movement of hot coffee vapors upwardly from the brew basket.

It is an object of the present invention to provide a splash retaining assembly for use with a coffeemaker having a spray head and a brew basket mountable therebelow within basket support guides wherein the splashing of coffee oils and the movement of coffee vapors upwardly into contact with a coffeemaker is minimized.

It is an object of the present invention to provide a splash retaining assembly for use with a coffeemaker having a spray head and a brew basket mountable therebelow within basket support guides wherein usage with a great number of varieties of different configured coffee baskets is possible.

It is an object of the present invention to provide a splash retaining assembly for use with a coffeemaker having a spray head and a brew basket mountable therebelow within basket support guides wherein use with the greatest variety of differently configured possible coffeemakers is made possible.

It is an object of the present invention to provide a splash retaining assembly for use with a coffeemaker having a spray head and a brew basket mountable therebelow within basket support guides wherein cleaning operations of the coffeemaker normally performed periodically are minimized.

It is an object of the present invention to provide a splash retaining assembly for use with a coffeemaker having a spray head and a brew basket mountable therebelow within basket support guides wherein cost of the replacement structure is minimized.

It is an object of the present invention to provide a splash retaining assembly for use with a coffeemaker having a spray head and a brew basket mountable therebelow within basket support guides wherein maintenance of the splash retaining assembly is minimized.

It is an object of the present invention to provide a splash retaining assembly for use with a coffeemaker having a spray head and a brew basket mountable therebelow within basket support guides wherein movement of coffee vapors upwardly into contact with the coffeemaker are minimized whereas the movement of hot water downwardly through the spray head is unaffected.

It is an object of the present invention to provide a splash retaining assembly for use with a coffeemaker having a spray head and a brew basket mountable therebelow within basket support guides wherein retaining within the basket support guides of the splash retaining assembly is a fixed attachment which is still detachable.

It is an object of the present invention to provide a splash retaining assembly for use with a coffeemaker having a spray head and a brew basket mountable therebelow within basket support guides wherein a brew basket is fixedly retained within the mounting slot defined within the assembly.

It is an object of the present invention to provide a splash retaining assembly for use with a coffeemaker having a spray head and a brew basket mountable therebelow within basket support guides wherein costs are minimized.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
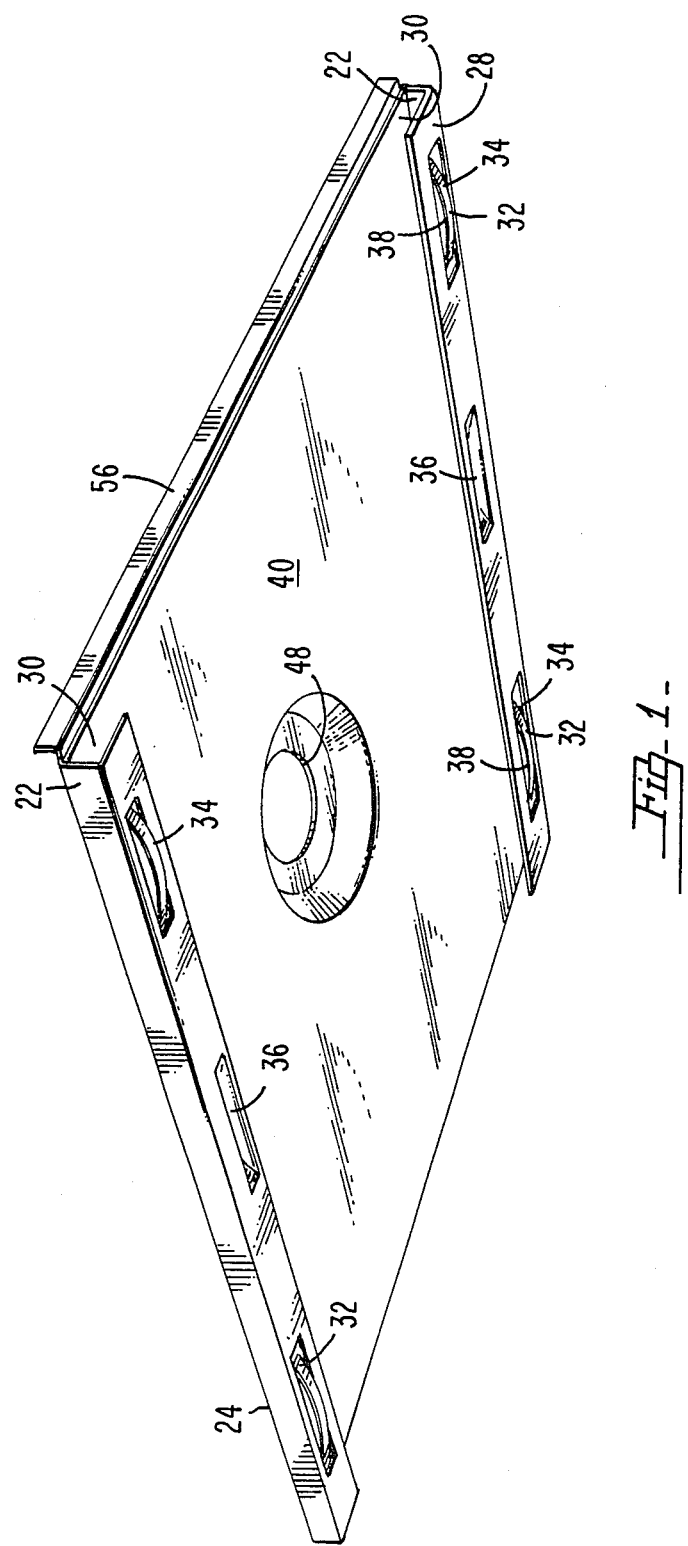
FIG. 1 is a perspective illustration of an embodiment of the spring retaining assembly of the present invention.

The present invention provides a splash retaining assembly for use with a coffeemaker having a spray head 10 with a brew basket 12 detachably mounted therebelow within basket support guides 14. The spray head 10 is designed to gravity feed hot water into a brew basket 12 having coffee therein for the formation of coffee dripping downwardly into a coffeepot or other container located therebelow.

The splash retaining assembly of the present invention is designed to prevent the splashing of coffee or movement of hot coffee vapors upwardly from the brew basket 12 past the spray head 10 into contact with the surrounding coffeemaker construction. For this purpose, a main plate means 16 may be fixedly secured with respect to a shield plate means 40. Main plate means 16 may include a horizontally extending section extending laterally outwardly into position within the basket support guides 14. Horizontal section 18 defines generally centrally therein a main central aperture 20 positioned below the spray head 10 to allow the movement of brewing water from spray head 10 downwardly into the brew basket 12 therebelow.

At the laterally outermost edges 24 of horizontal section 18 will be defined vertical sections 22 extending downwardly therefrom. At the lowermost edges 28 of vertical sections 22 will be defined lower lip means 26 extending laterally inwardly therefrom toward the main central aperture 20. The lower lip means 26 in combination with the vertical sections 22 and the horizontal section 18 will define longitudinally extending slot means 30 at each laterally outermost edges 24 of the horizontal section 18. Each longitudinal slot means 30 will face inwardly therefrom and define mounting slots 30 into which the brew basket 12 can be mounted.

Figure 2:
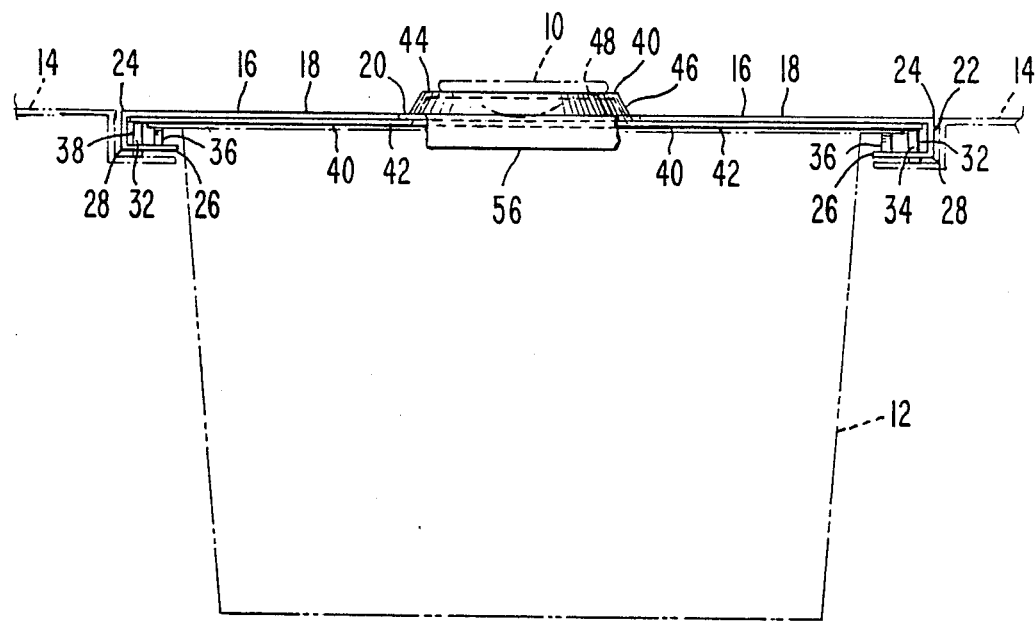
FIG. 2 is a front plan view of an embodiment of the splash retaining assembly of the present invention shown in place in a coffeemaker with a brew basket suspended downwardly therefrom.
Figure 4:
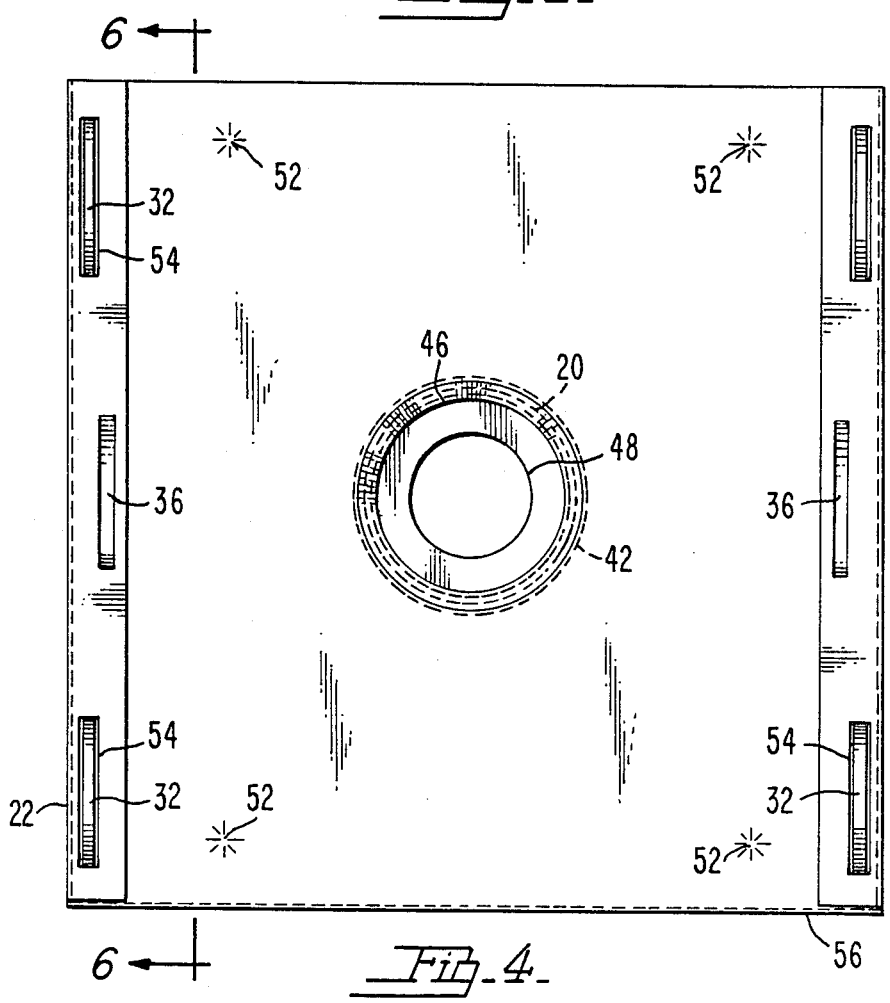
FIG. 4 is a bottom plan view of an embodiment of the splash retaining assembly of the present invention.
Figure 3:
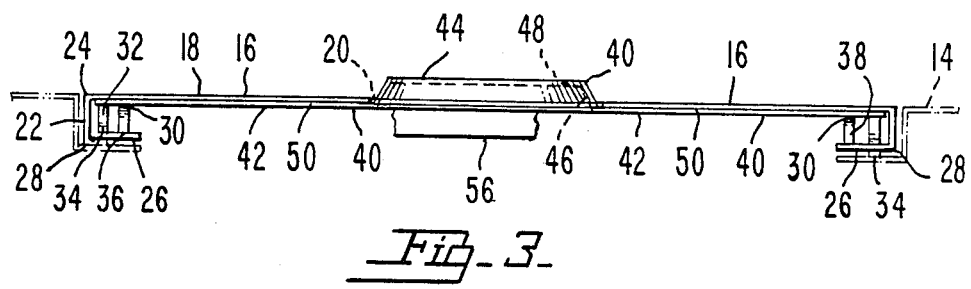
FIG. 3 is a front cross sectional view of an embodiment of the splash retaining assembly of the present invention shown in place within the coffeemaker.
Figure 5:
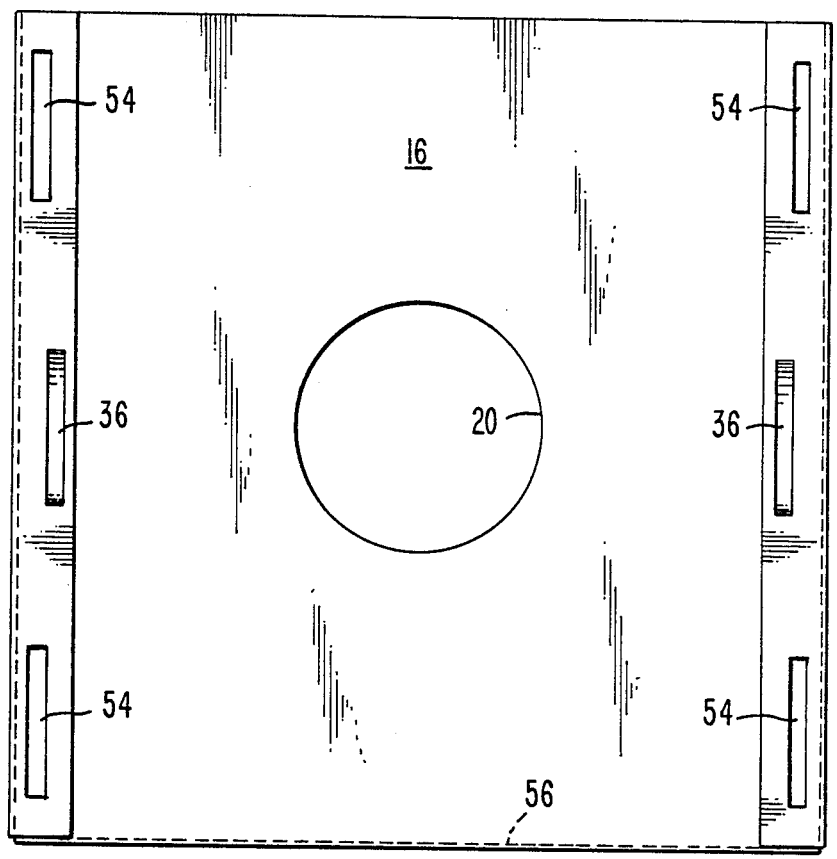
FIG. 5 is a bottom plan view of an embodiment of the shield plate means of the present invention.
Figure 6:
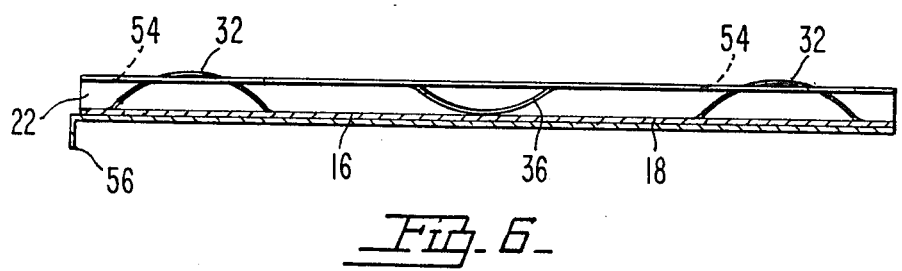
FIG. 6 is a side view of an embodiment of the splash retaining assembly of the present invention.

The main plate means 16 may include a basket biasing means 36 such as flat spring means 38 in the upper side of the lower lip means 26 and extending upwardly therefrom to exert an upwardly directed bias. With the flat springs 38 positioned generally in the middle longitudinally of the longitudinal slot means 30, the brew basket 12 will be capable of being placed between the flat spring means 38 and the upper portion of the longitudinal slot 30 in such a position as to be biased in place. With the brew basket 12 in position as shown best in FIG. 2, the flat spring means 38 of the basket biasing means 36 will exert an upwardly directed force for detachably retaining the brew basket 12 in position.

The shield plate means 40 of the present invention is preferably defined to include an outer section 42 which preferably extends below said horizontal section 18 of main plate means 16 in such a manner as to be attached thereto such as by spot weld 52. The outer section 42 will be secure or integral with respect to an upper selection 44 extending upwardly in the central area thereof. Generally the outer section 42 will extend around upper section 44 Upper section 44 will preferably extend vertically upward and inwardly from the outer section 42 in such a manner as to define an arcuate area thereof having a concave section 46 facing downwardly. Concave section 46 will preferably define in the central area thereof a central shield aperture 46 positioned directly vertically above the main central aperture 20 and in the immediate vicinity of spray head 10. Thus with the outer section 44 of shield plate means 42 secured by spot weld 52 to the lower surface 50 of horizontal section 18 of main plate 16, the upper section 44 of the shield plate 40 will be positioned directly in adjacent and perhaps in abutment with respect to the spray head 10 such as to allow the full movement of water downwardly when released by spray head 10 but to prevent the movement of hot coffee vapors or splashed coffee upwardly therepast.

To facilitate mounting of the entire splash retaining assembly of the present invention within the basket support guides, it may be preferable for the lower lip means 26 to define longitudinally extending openings 54 therein. Also the shield plate means 40 can define a downwardly facing main biasing means 32 such as flat springs 34 which are positioned in registration with respect to the longitudinal openings 54 in such a manner as to extend downwardly therethrough. In this manner the flat spring means 34 of the main biasing means 32 will extend through the longitudinal opening means 54 and be in contact with the upper surface of lower lip means 26. In this manner the entire splash retaining assembly of the present invention will be forcibly held in position within the basket support guides. The main biasing means 32 will extend to a sufficient distance through the longitudinal opening 54 to contact the basket support guides 14 and maintain biased engagement therewith. With this configuration preferably having four such longitudinal openings 54 in cooperation with four such main biasing means 32 with two positioned extending through each lateral lower lip means 26, the splash retaining assembly will be maintained in fixed securement while still being capable of easy detachable removal thereof. To further facitlitate such removal or placement, it is possible to define a handle means 56 secured with respect to the main plate means or the shield plate means as chosen.

In the preferred configuration, the main plate means and the shield plate means will both be formed of a flexibly resilient stainless steel material. It is also preferable that the material of the shield plate means be somewhat thinner and somewhat more flexible than the material of the main plate means since some flexing will be required during insertion of the splash retaining assembly in order to provide vertical clearance below the spray head 10 of the coffeemaker.

With this configuration the coffeemaker itself will be completely shielded against contact with splashed coffee or coffee vapors such that merely cleaning of the splash retaining assembly of the present invention will comprise the entire cleaning operation of the coffeemaker itself.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intented to be illustrative only and not intended to limit the scope of the invention.

I claim:

1. A splash retaining assembly, for use with a coffeemaker having a spray head and a brew basket mountable therebelow within basket support guides, comprising:
(a) a main plate means extending generally horizontally and adapted to be removably positionable mounted within the basket support guides, said main plate means further including:
   (1) a horizontal section extending generally horizontally between the basket support guides and defining a main central aperture therein positioned vertically below the spray head of the coffeemaker;
   (2) vertical sections at the laterally outermost edges of said horizontal section and extending downwardly therefrom;
   (3) lower lip means extending laterally inwardly from the lowermost edges of said vertical sections, said lower lip means in cooperation with said horizontal section and adjacent vertical section defining longitudinally extending slot means along each outermost lateral edge of said horizontal section adapted to receive a conventional brew basket detachably mounted therein;
   (4) a main biasing means located adjacent said slot means and extending outwardly therefrom to bias said splash retaining assembly firmly in position within the basket support guides;
   (5) a basket biasing means positioned within said slot means and adapted to exert bias against a brew basket positioned therein to firmly retain the brew basket in place while allowing selective removal thereof;
(b) a shield plate means secured to said main plate means and adapted to be positioned adjacent to the spray head thereabove, said shield plate means including:
   (1) an outer section extending generally horizontally and being adjacent said horizontal section of said main plate means; and
   (2) an upper section generally centrally located with respect to said outer section and extending upwardly and inwardly therefrom, said upper section defining a central shield aperture therein adapted to be positioned above said main central aperture of said main plate and immediately below the spray head for shielding same from coffee vapors rising from the brew basket.

2. A splash retaining assembly as defined in claim 1 wherein said outer section of said shield plate means extends horizontally adjacent to the lower surface of said horizontal section of said main plate means.

3. A splash retaining assembly as defined in claim 1 wherein said outer section of said shield plate means is secured with respect to said horizontal section of said main plate means.

4. A splash retaining assembly as defined in claim 3 wherein said outer section of said shield plate means is spot welded with respect to said horizontal section of said main plate means.

5. A splash retaining assembly as defined in claim 1 wherein said basket biasing means comprises a flat spring of resilient material extending upwardly from the upper surface of said lower lip means.

6. A splash retaining assembly as defined in claim 5 wherein said flat spring is of resiliently flexible stainless steel.

7. A splash retaining assembly as defined in claim 5 wherein said basket biasing means is positioned in the approximate longitudinal center of said laterally extending slot means to contact a brew basket positioned centrally below the spray head of the coffeemaker.

8. A splash retaining assembly as defined in claim 2 wherein said shield plate means extends below said horizontal section of said main plate means into said slot means and wherein said lower lip means define longitudinal opening means therein, said shield plate means including a main biasing means extending downwardly therefrom through said longitudinal opening means to bias against the basket support guides for firmly retaining the splash retaining assembly therein.

9. A splash retaining assembly as defined in claim 8 wherein said main biasing means comprises a flat spring of resiliently flexible material.

10. A splash retaining assembly as defined in claim 9 wherein said flat spring is of resiliently flexible stainless steel.

11. A splash retaining assembly as defined in claim 8 wherein said main biasing means comprises two flat springs in each slot means and wherein said longitudinal opening means comprises two longitudinal openings in each lower lip means to more firmly hold the splash retaining assembly within the basket support guides.

12. A splash retaining assembly as defined in claim 1 wherein said shield plate is of a flexibly resilient stainless steel material.

13. A splash retaining assembly as defined in claim 1 wherein said central shield aperture of said upper section extends circumferentially around the spray head to prevent passage of hot rising coffee vapors upwardly beyond the splash retaining assembly.

14. A splash retaining assembly as defined in claim 1 wherein said main plate means includes a handle means secured to said horizontal section thereof to facilitate placement and removal thereof with respect to the basket support guides.

15. A splash retaining assembly as defined in claim 1 wherein said main plate means and said shield plate means are both of a stainless steel material, said shield plate means being of a more flexibly resilient and thin stainless steel material than said main plate means.

16. A splash retaining assembly as defined in claim 1 wherein said upper section of said shield plate means is arcuate to define a downwardly facing concave surface.

17. A splash retaining assembly as defined in claim 1 wherein said central shield aperture of said shield plate means is oriented directly vertically above said central aperture of said main plate means.

18. A splash retaining assembly as defined in claim 1 wherein said main biasing means defined in each lateral slot means is positioned laterally outwardly from said basket biasing means.

19. A splash retaining assembly, for use with a coffeemaker having a spray head and a brew basket mountable therebelow within basket support guides, comprising:

(a) a main plate means extending generally horizontally and adapted to be removably positionable mounted within the basket support guides, said main plate means being of a flexibly resilient stainless steel material and further including:

(1) a horizontal section extending generally horizontally between the basket support guides and defining a main central aperture therein positioned vertically below the spray head of the coffeemaker;

(2) vertical sections at the laterally outermost edges of said horizontal section and extending downwardly therefrom;

(3) lower lip means extending laterally inwardly from the lowermost edges of said vertical sections, said lower lip means in cooperation with said horizontal section and adjacent vertical section defining longitudinally extending slot means along each outermost lateral edge of said horizontal section adapted to receive a conventional brew basket detachably mounted therein, said lower lip means also defining longitudinal opening means therein, each of said longitudinal opening means including two longitudinal openings therein;

(4) a main biasing means located adjacent said slot means and extending outwardly therefrom to bias said splash retaining assembly firmly in position within the basket support guides;

(5) a basket biasing means positioned in the approximate longitudinal center of said laterally extending slot means to contact a brew basket positioned centrally below the spray head of the coffeemaker, said basket biasing means being adapted to exert bias against a brew basket positioned therein to firmly retain the brew basket in place while allowing selective removal thereof, said basket biasing means further comprising a flat spring of resiliently flexible stainless steel material extending upwardly from the upper surface of said lower lip means;

(6) a handle means secured to said horizontal section to facilitate placement and removal thereof with respect to the basket support guides;

(b) a shield plate means secured to said main plate means and adapted to be positionable adjacent to the spray head thereabove, said shield plate means being of a flexibly resilient stainless steel material being thinner and capably of greater flexibility than said main plate means, said shield plate means including:

(1) an outer section extending generally horizontally and being positioned adjacent to the lower surface of said horizontal section of said main plate means and fixedly secured thereto; and (2) an upper section generally centrally located with respect to said outer section and extending upwardly and inwardly therefrom, said upper section being arcuate to define a downwardly facing concave surface, said upper section defining a central shield aperture therein adapted to be positioned in orientation directly above said main central aperture of said main plate and extending circumferentially around the spray head to prevent passage of hot rising coffee vapors upwardly beyond the splash retaining assembly for shielding coffeemaker from said vapors; and (3) a main biasing means secured to said shield plate means and extending downwardly therefrom through said longitudinal opening means to bias against the basket support guides for firmly retaining the splash retaining assembly therein, said main biasing means comprising two flat springs of resiliently flexible stainless steel positioned in each slot means extending downwardly through said longitudinal openings in each of said lower lip means to more firmly hold the splash retaining assembly within the basket support guides, said main biasing means being positioned laterally outwardly from said basket biasing means to prevent contact with a brew basket during movement inwardly through said longitudinally extending slot means to position in abutment with respect to said basket biasing means.

* * * * *